US010583755B2

(12) United States Patent
Frye et al.

(10) Patent No.: US 10,583,755 B2
(45) Date of Patent: Mar. 10, 2020

(54) RECLINER FOR A VEHICLE SEAT

(71) Applicant: Faurecia Automotive Seating, LLC, Auburn Hills, MI (US)

(72) Inventors: Dale J. Frye, West Olive, MI (US); Rod Goodrich, Watervliet, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 16/049,882

(22) Filed: Jul. 31, 2018

(65) Prior Publication Data
US 2019/0039484 A1 Feb. 7, 2019

Related U.S. Application Data

(60) Provisional application No. 62/540,280, filed on Aug. 2, 2017.

(51) Int. Cl.
*B60N 2/20* (2006.01)
*B60N 2/225* (2006.01)
*B60N 2/22* (2006.01)

(52) U.S. Cl.
CPC ......... *B60N 2/2213* (2013.01); *B60N 2/2227* (2013.01)

(58) Field of Classification Search
CPC ........................... B60N 2/2213; B60N 2/2227
USPC ................... 297/362, 476, 479, 484
See application file for complete search history.

(56) References Cited

U.S. PATENT DOCUMENTS

| | | | | | |
|---|---|---|---|---|---|
| 4,488,451 A | * | 12/1984 | Ligensa | ................. | B60N 2/433 297/362 X |
| 4,573,738 A | * | 3/1986 | Heesch | ................ | B60N 2/2213 297/362 |
| 4,687,252 A | * | 8/1987 | Bell | ..................... | B60N 2/2213 297/362 |
| 4,720,144 A | * | 1/1988 | Heesch | ................ | B60N 2/2213 297/362 |
| 4,733,912 A | * | 3/1988 | Secord | ................... | B60N 2/433 297/362 |
| 4,805,961 A | * | 2/1989 | Garrod | ................. | B60N 2/2213 297/362.14 |
| 4,929,024 A | * | 5/1990 | Secord | ................. | B60N 2/2231 297/362 |
| 4,946,223 A | * | 8/1990 | Croft | .................... | B60N 2/2352 297/362 |
| 4,986,514 A | * | 1/1991 | Ikegaya | ............... | B60N 2/2213 297/362 X |
| 5,248,184 A | * | 9/1993 | Morris | ................. | B60N 2/2231 297/362 |
| 5,435,624 A | * | 7/1995 | Bray | .................... | B60N 2/0232 297/362 |
| 5,735,574 A | | 4/1998 | Serber | | |
| 5,813,725 A | * | 9/1998 | Robinson | ............. | B60N 2/2352 297/362 |
| 5,971,491 A | * | 10/1999 | Fourrey | .............. | B60R 22/1951 297/484 X |

(Continued)

FOREIGN PATENT DOCUMENTS

JP           06227299 A   *   8/1994   ........... B60N 2/0284

*Primary Examiner* — Rodney B White
(74) *Attorney, Agent, or Firm* — Barnes & Thornburg LLP

(57) ABSTRACT

A vehicle seat includes a seat bottom and a seat back coupled to the seat bottom and configured to move relative to the seat bottom. A reclining assembly is coupled to the seat bottom and the seat back to move the seat back relative to the seat bottom.

19 Claims, 5 Drawing Sheets

(56) References Cited

U.S. PATENT DOCUMENTS

| | | | | |
|---|---|---|---|---|
| 6,193,316 B1* | 2/2001 | Janke | ................... | B60N 2/2213 297/362 |
| 6,543,850 B1* | 4/2003 | Becker | ................. | B60N 2/0232 297/362 |
| 6,733,076 B2* | 5/2004 | Grable | ................. | B60N 2/0284 297/362 |
| 6,968,598 B2* | 11/2005 | Becker | .................... | B60N 2/20 297/362 X |
| 7,461,899 B2* | 12/2008 | Seibold | ................ | B60N 2/2352 297/362 |
| 7,566,099 B2* | 7/2009 | Catanzarite | ............ | A47C 1/025 297/362 X |
| 7,726,742 B2* | 6/2010 | Keyser | ................. | B60N 2/0232 297/362 |
| 7,780,230 B2 | 8/2010 | Serber | | |
| 7,837,268 B2* | 11/2010 | Becker | ................. | B60N 2/12 297/362 |
| 8,052,215 B2* | 11/2011 | Ito | ........................ | B60N 2/0232 297/362 X |
| 8,100,478 B2* | 1/2012 | Ellison | ................ | B60N 2/3013 297/362 X |
| 8,469,400 B2* | 6/2013 | Merrill | .................... | B60N 2/24 297/484 X |
| 8,469,401 B2* | 6/2013 | Humbert | ................. | B60N 2/24 297/484 X |
| 8,672,796 B2* | 3/2014 | Schulz | ................ | B60N 2/1655 297/362 X |
| 9,340,130 B2 | 5/2016 | Tanaka | | |
| 2002/0011748 A1* | 1/2002 | Ito | ........................ | B60N 2/0232 297/362 |
| 2004/0251727 A1* | 12/2004 | Beneker | ............... | B60N 2/2251 297/362 |
| 2006/0131946 A1* | 6/2006 | Andrigo | ................. | B60N 2/933 297/378.1 |
| 2008/0238171 A1* | 10/2008 | Kojima | .................. | B60N 2/206 297/362 |
| 2011/0084531 A1* | 4/2011 | Hida | .................... | B60N 2/0232 297/362 |
| 2011/0101752 A1* | 5/2011 | Deegener | ............. | B60N 2/0232 297/362 X |
| 2012/0119554 A1* | 5/2012 | Berres | ................. | B60N 2/0232 297/362 |
| 2013/0009438 A1* | 1/2013 | Stemmer | ............. | B60N 2/0232 297/362 |

* cited by examiner

RECLINER FOR A VEHICLE SEAT

PRIORITY CLAIM

This application claims priority under 35 U.S.C. § 119(e) to U.S. Provisional Application Ser. No. 62/540,280, filed Aug. 2, 2017, which is expressly incorporated by reference herein.

BACKGROUND

The present disclosure relates to a seat, and particularly to a vehicle seat. More particularly, the present disclosure relates to a vehicle seat including a reclining assembly and retention assembly for the vehicle seat.

SUMMARY

According to the present disclosure, a vehicle seat includes a seat bottom and a seat back. The seat back is coupled to the seat bottom to move relative to the seat bottom.

In illustrative embodiment, the vehicle seat further includes a reclining assembly coupled to the seat bottom and the seat back. The reclining assembly is configured to move the seat back about a virtual center of rotation located forward of the seat back. The virtual center of rotation is located above the seat bottom.

In the illustrative embodiments, the reclining assembly may include a gear coupled to the seat bottom. A first link may have a first end coupled to the seat back and a second end that meshes along the gear. A second link may have a first end coupled to the seat back and a second end that meshes along the gear. The gear may have a plurality of teeth positioned circumferentially around the gear. The second end of the first link may have a plurality of teeth that mesh within the teeth of the gear. The second end of the second link may have a plurality of teeth that mesh within the teeth of the gear.

In the illustrative embodiments, movement of the seat back relative to the seat bottom may include a linear component and an angular component.

In the illustrative embodiments, the vehicle seat may include a retention assembly having at least one driving belt coupled to the seat bottom and the seat back. A driven belt may be coupled to the driving belt and the seat back. The driven belt may be configured to position around an occupant of the vehicle seat. The at least one driving belt may apply tension to the driven belt when a force is applied to the vehicle seat.

In illustrative embodiments, a vehicle seat may include a seat bottom and a seat back coupled to the seat bottom and configured to move relative to the seat bottom. A locking assembly is coupled to the seat bottom. A pair of driving belts is coupled to the locking assembly. A driven belt is coupled to the pair of driving belts and the seat back. The driven belt is configured to position around an occupant of the vehicle seat. One of the pair of driving belts applies tension to the driven belt when a force is applied to the vehicle seat.

In the illustrative embodiments, the pair of driving belts may have a first driving belt and a second driving belt. The first driving belt may apply tension to the driven belt when a forward force is applied to the vehicle seat. The second driving belt may apply tension to the driven belt when a backward force is applied to the vehicle seat.

In the illustrative embodiments, the vehicle seat may have a bridle that couples the pair of driving belts to the driven belt. One of the pair of driving belts may move the bridle to apply tension to the driven belt.

In the illustrative embodiments, the locking assembly may have a forward locking unit and a rearward locking unit. The forward locking unit may be coupled to a first driving belt of the pair of driving belts. The rearward locking unit may be coupled to a second driving belt of the pair of driving belts.

In the illustrative embodiments, one of the pair of driving belts may include a first segment extending from the locking assembly to a first crossbar. A second segment may extend from the first segment to a second crossbar. A third segment may extend from the second segment to a third crossbar. A fourth segment may extend from the third segment to a bridle that couples to the driven belt. One of the pair of driving belts may have a first segment extending from the locking assembly to a crossbar. A second segment may extend from the first segment to a bridle that couples to the driven belt. The driven belt may have a first segment extending from a fixed end at a crossbar to a bridle that couples to the pair of driving belts. A second segment may extend from the first segment to the crossbar. A third segment may extend from the second segment to a buckle end.

In the illustrative embodiments, the vehicle seat may have a reclining assembly coupled to the seat bottom and the seat back. The reclining assembly may be configured to move the seat back about a virtual center of rotation located forward of the seat back. The virtual center of rotation may be located above the seat bottom. The reclining assembly may have a gear coupled to the seat bottom. A first link may have a first end coupled to the seat back and a second end that meshes along the gear. A second link may have a first end coupled to the seat back and a second end that meshes along the gear.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
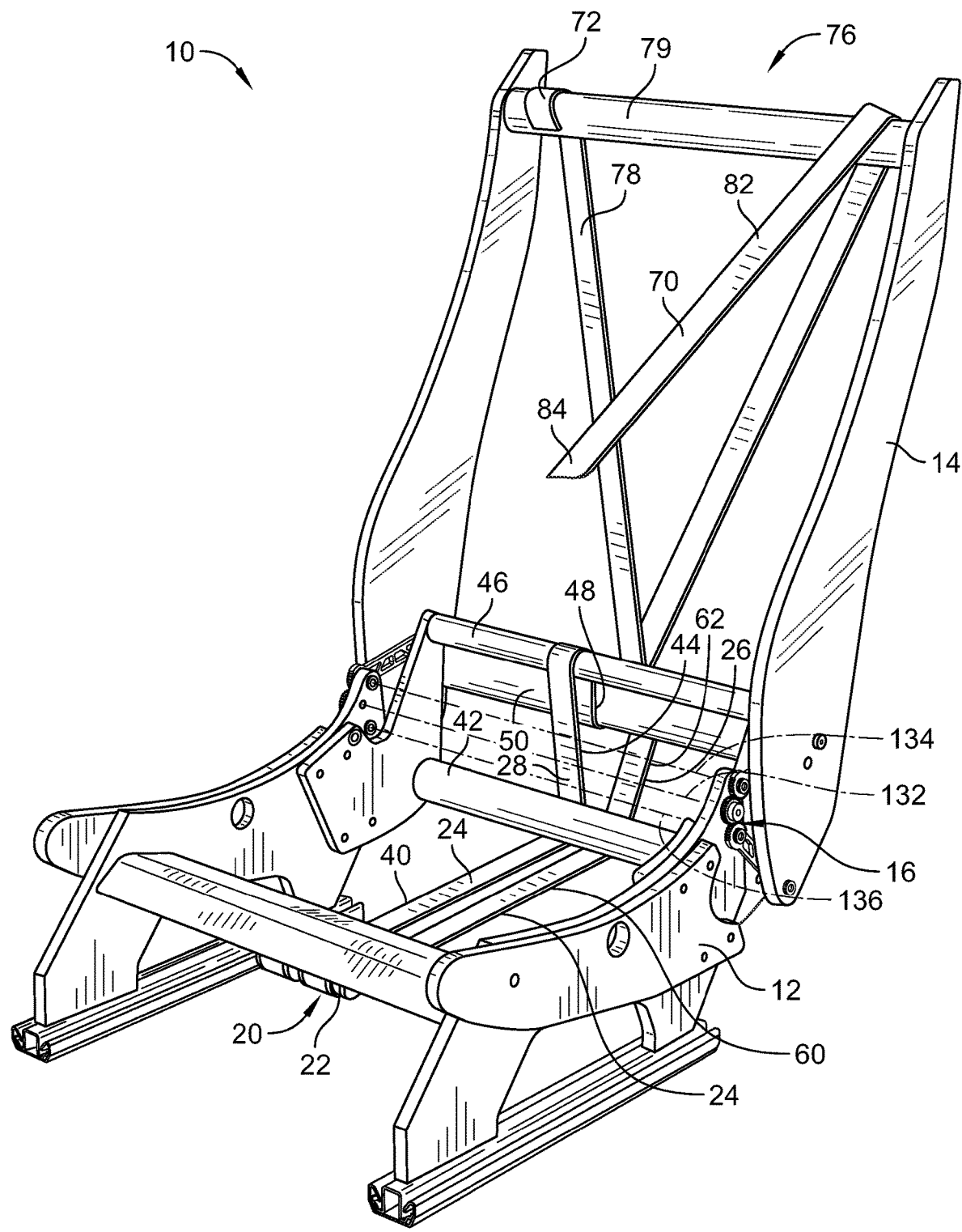
FIG. 1 is a front perspective view of a portion of a vehicle seat including a seat back movably coupled to a seat bottom, a reclining assembly to move the seat back relative to the seat bottom, and a retention assembly that is configured to retain an occupant in the vehicle seat.

A vehicle seat 10 includes a seat bottom 12 and a seat back 14 configured to move relative to the seat bottom 12 as shown in FIG. 1. A reclining assembly 16 is provided that moves the seat back 14 relative to the seat bottom 12. The reclining assembly 16 is configured to move the seat back 14 about a virtual center of rotation that is positioned above the seat bottom 12 and forward of the seat back 14. The movement of the seat back 14 includes a lateral component and a rotational component to provide additional comfort to the occupant of the vehicle seat 10. That is, by moving the seat back 14 about the virtual center of rotation rather than the actual center of rotation of the seat back 14, the seat back 14 has a more natural movement that is more comfortable to the occupant.

The vehicle seat 10 also includes a retention assembly 20 that includes a locking assembly 22 that is coupled to a pair of driving belts 24. The pair of driving belts 24 includes a forward force driving belt 26 and a rearward force driving belt 28. The forward force driving belt 26 is coupled to a forward locking unit 30 of the locking assembly 22, and the rearward force driving belt is coupled to a rearward locking unit 32 of the locking assembly 22. The locking assembly 22 is configured to lock the pair of driving belts 24 when force is applied to the vehicle seat 10. That is, the forward locking unit 30 locks the forward force driving belt 26, and the rearward locking unit 32 locks the rearward force driving belt 28.

The rearward force driving belt 28 includes a seat segment 40 that extends from the rearward locking unit 32 to a crossbar 42 in the seat bottom 12. The seat segment 40 extends substantially horizontal. The rearward force driving belt 28 wraps around the crossbar 42 and a back segment 44 extends from the crossbar 42 to another crossbar 46 in the seat back 14. The back segment 44 extends substantially vertical. The rearward force driving belt 28 wraps around the crossbar 46 and another back segment 48 extends from the crossbar 46 to another crossbar 50 in the seat back 14. The back segment 48 extends substantially vertical. The rearward force driving belt 28 wraps around the crossbar 50 and another back segment 52 extends to a bridle 54 (shown in FIG. 5). The back segment 52 extends substantially vertical.

The forward force driving belt 26 includes a seat segment 60 that extends from the forward locking unit 30 to the crossbar 42. The forward force driving belt 26 wraps around the crossbar 42 and a back segment 62 extends at an angle from the seat segment 60 to the bridle 54.

A driven belt 70 includes a fixed end 72 that is coupled to a crossbar 74 at a top 76 of the seat back 14. A seat back segment 78 extends from the fixed end 72 to the bridle 54. The driven belt 70 is secured to the bridle 54. The bridle 54 secures the driven belt 70 to the driving belts 24. Another seat back segment 80 extends from the bridle 54 back to the crossbar 74. The driven belt 70 wraps around the crossbar 74 and a chest belt 82 extends from the seat back segment 80 to a buckle end 84. The chest belt 82 is configured to position across the occupant's chest. A buckle (not show) is positioned at an end 86 of the chest belt 82 to secure the chest belt 82 to the occupant.

Figure 2:
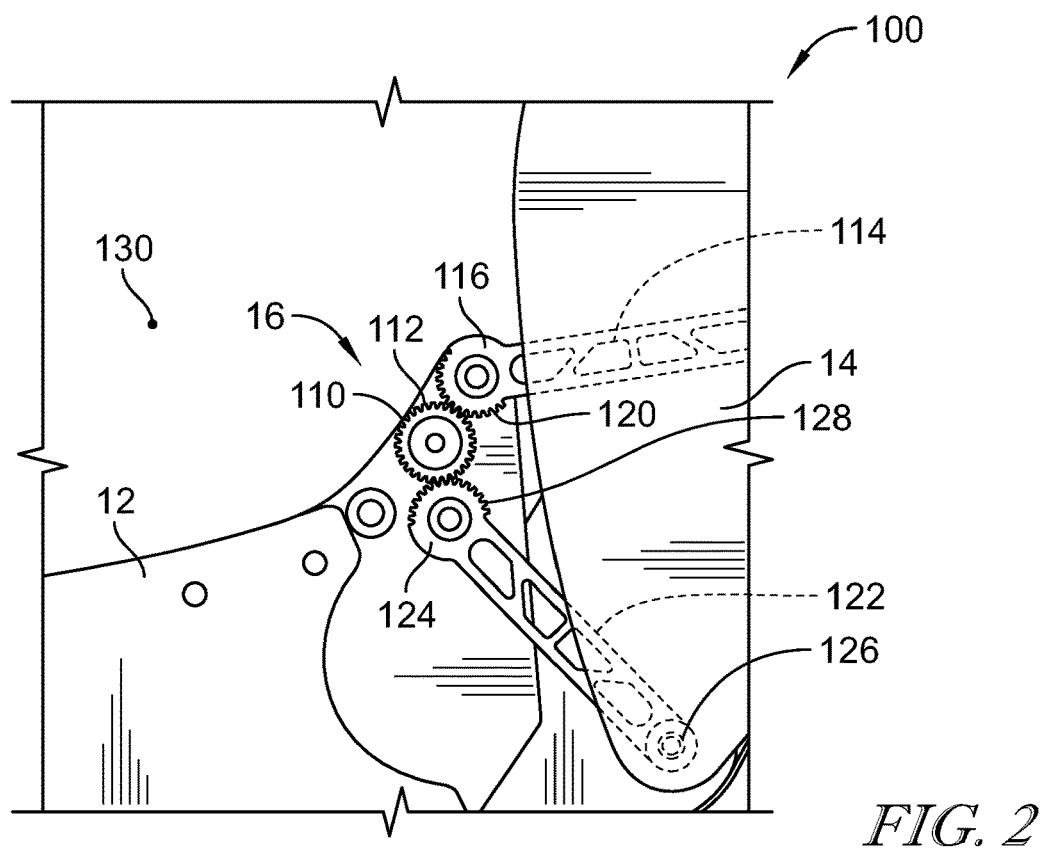
FIG. 2 is a side elevation view of the reclining assembly of FIG. 1 configured to position the seat back in an upright position relative to the seat bottom.
Figure 3:
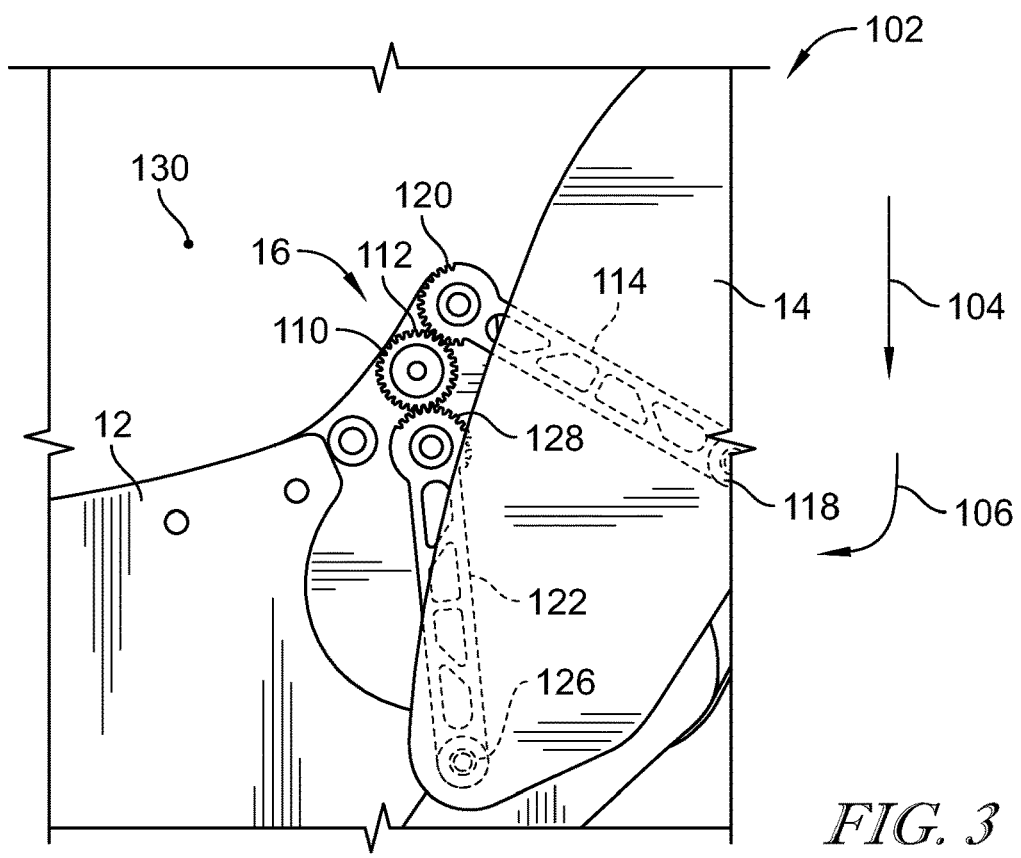
FIG. 3 is a view similar to FIG. 3 showing the reclining assembly configured to position the seat back in a reclined position relative to the seat bottom.

Referring to FIGS. 2 and 3, the reclining assembly 16 is configured to move the vehicle seat 10 between an upright position 100 (shown in FIG. 2) and a reclined position 102 (shown in FIG. 3). The reclining assembly 16 is configured to lock the seat back 14 is various positions between the upright position 100 and the reclined position 102. The reclining assembly 16 moves the seat back 14 relative to the seat bottom 12. When moving between the upright position 100 and the reclined position 102, the seat back 14 has a vertical movement, as illustrated by arrow 104, and a rotational movement, as indicated by arrow 106.

The reclining assembly 16 includes a gear 110 coupled to the seat bottom 12. The gear 110 rotates about an axis 132 (shown in FIG. 1). The gear 110 is generally circular and includes a plurality of teeth 112 positioned circumferentially around the gear 110. A top link 114 is coupled between the gear 110 and the seat back 14. The top link 114 includes a gear end 116 that couples to the gear 110 and a seat end 118 that couples to the seat back 14. The gear end 116 rotates about an axis 134 (shown in FIG. 1). The gear end 116 includes a plurality of teeth 120 that mesh with the teeth 112 of the gear 110 so that the gear end 116 can rotate around the gear 110. A bottom link 122 is also coupled between the gear 110 and the seat back 14. The bottom link 122 includes a gear end 124 that couples to the gear 110 and a seat end 126 that couples to the seat back 14. The gear end 124 rotates about an axis 136 (shown in FIG. 1). The gear end 124 includes a plurality of teeth 128 that mesh with the teeth 112 of the gear 110 so that the gear end 124 rotates around the gear 110.

During movement of the seat back 14 relative to the seat bottom 12, the top link 114 and the bottom link 122 rotate around the gear 110 to rotate the seat back 14 about a virtual center of rotation 130. The virtual center of rotation 130 is positioned forward of the seat back 14 and above the seat bottom 12. The virtual center of rotation 130 is located forward of the axes 132, 134, and 136. The virtual center of rotation 130 better simulates an occupants more natural pivot. This natural pivot point ensures better alignment of lumbar position and comfort surfaces when the vehicle seat 10 is in a deeper recline mode.

Figure 4:
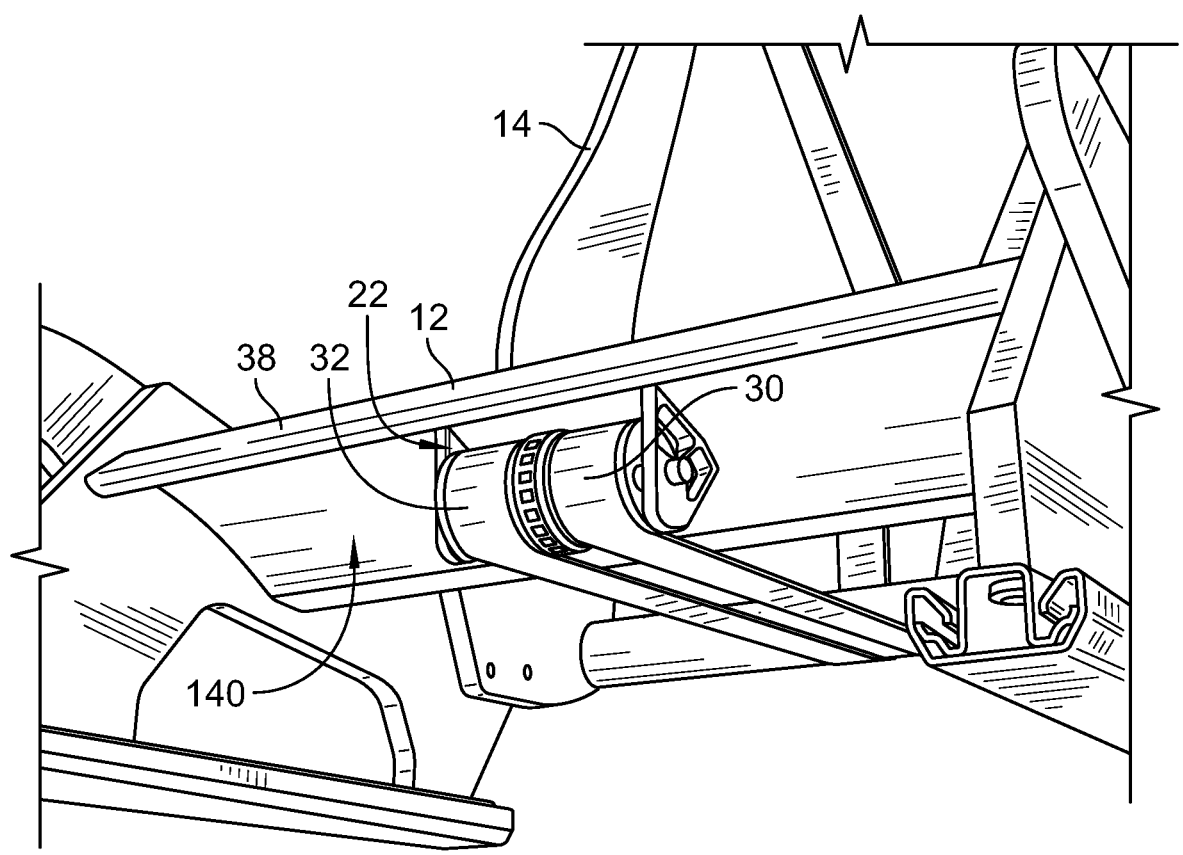
FIG. 4 is a bottom perspective view of a locking assembly of the retention assembly showing that the locking assembly includes a forward locking unit coupled to a first driving belt and a rearward locking unit coupled to a second driving belt.
Figure 5:
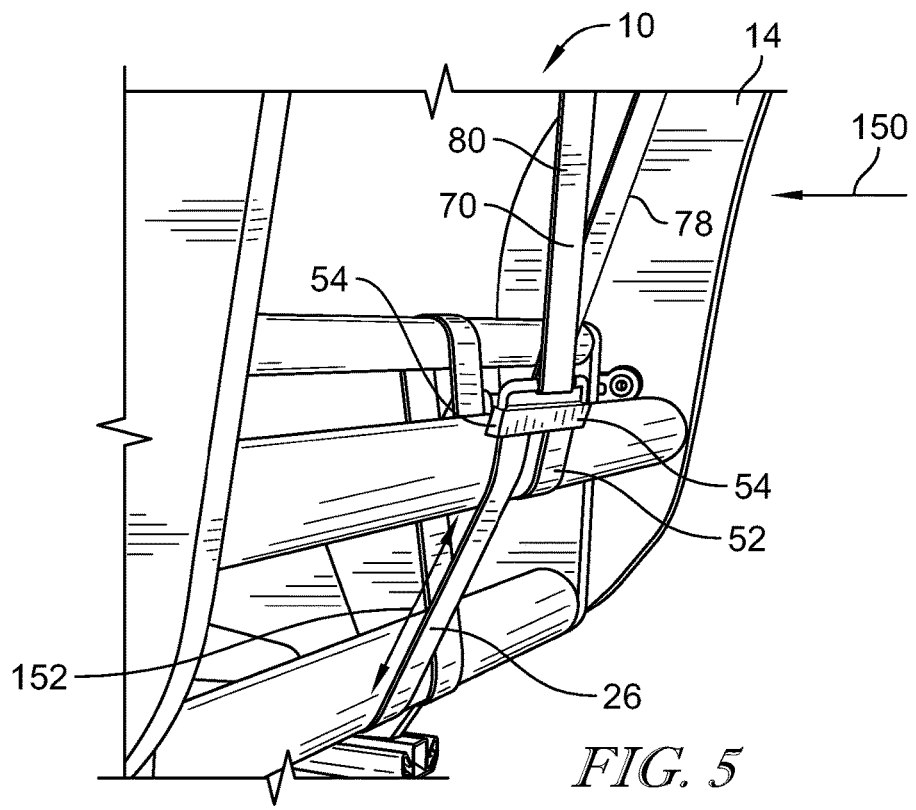
FIG. 5 is a rear perspective view of the retention assembly having a first driving belt in tension when a forward force is applied to the seat back.
Figure 6:
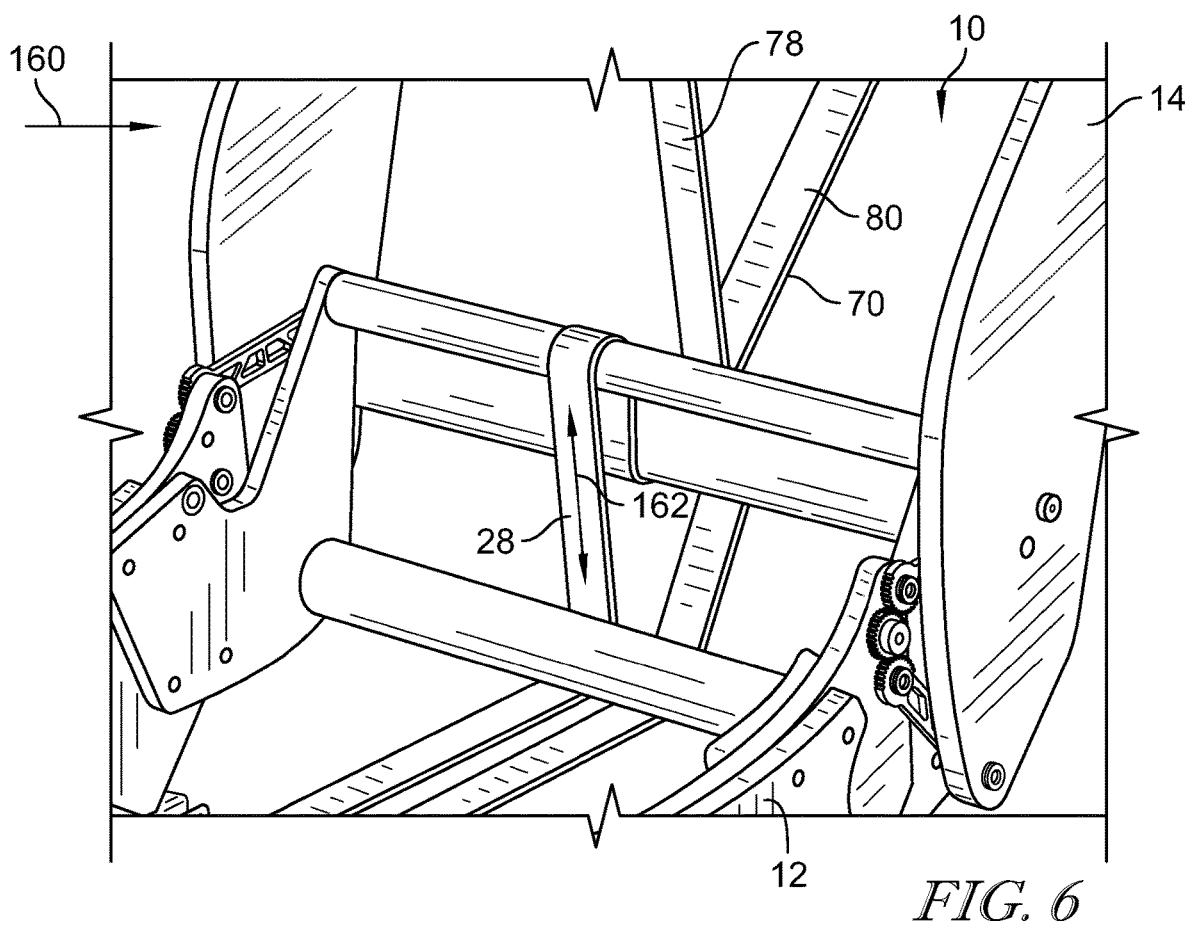
FIG. 6 is a front perspective view of the retention assembly having a second driving belt in tension when a backward force is applied to the seat back.

Referring to FIG. 4, the locking assembly 22 includes the forward locking unit 30 and the rearward locking unit 32. The locking assembly 22 is shown to be remotely fixed to an underside of the anti-submarine pan 38. However, the locking assembly 22 could be located in other positions to accommodate specific packaging requirements. The forward locking unit 30 and the rearward locking unit 32 are illustrated as being integral components. In some embodiments, the forward locking unit 30 and the rearward locking unit 32 are separate components and may be spaced about a bottom 140 of the seat bottom 12. The forward locking unit 30 is coupled to the forward driving belt 26. The forward locking unit 30 extends and retracts the forward driving belt 26 as the occupant positions the chest belt 82 around their chest and/or moves about the vehicle seat 10. Referring to FIG. 5, the forward locking unit 30 is configured to retract and lock the forward driving belt 26 when a forward force 150 is applied to vehicle seat 10. That is, the forward driving belt 26 is pulled into tension 152 when the forward force 150 is applied to the vehicle seat 10. Referring to FIG. 6, the rearward locking unit 32 is coupled to the rearward driving belt 28. The rearward locking 32 extends and retracts the rearward driving belt 28 as the occupant positions the chest belt 82 around their chest and/or moves about the vehicle seat 10. The rearward locking unit 32 is configured to retract and lock the rearward driving belt 28 when a rearward force 160 is applied to vehicle seat 10. That is, the rearward driving belt 28 is pulled into tension 162 when the rearward force 160 is applied to the vehicle seat 10.

When the tension 152 is applied to the forward driving belt 26 or when the tension 162 is applied to the rearward driving belt 28, the bridle 54 is pulled downward thereby applying a downward force to the driven belt 70. As the seat back segment 78 and the seat back segment 80 are pulled downward, the chest belt 82 is retracted in contracts onto the occupant's chest thereby securing the occupant in the vehicle seat 10.

The present disclosure utilizes the retention assembly 20 to provide additional strength to the vehicle seat 10 while also providing a measure of compliance to ensure the occupant and the vehicle seat 10 remain coupled for as long as possible. The forward driving belt 26 and the rearward driving belt 28 become tension members to better support the vehicle seat frame geometry.

Figure 7:
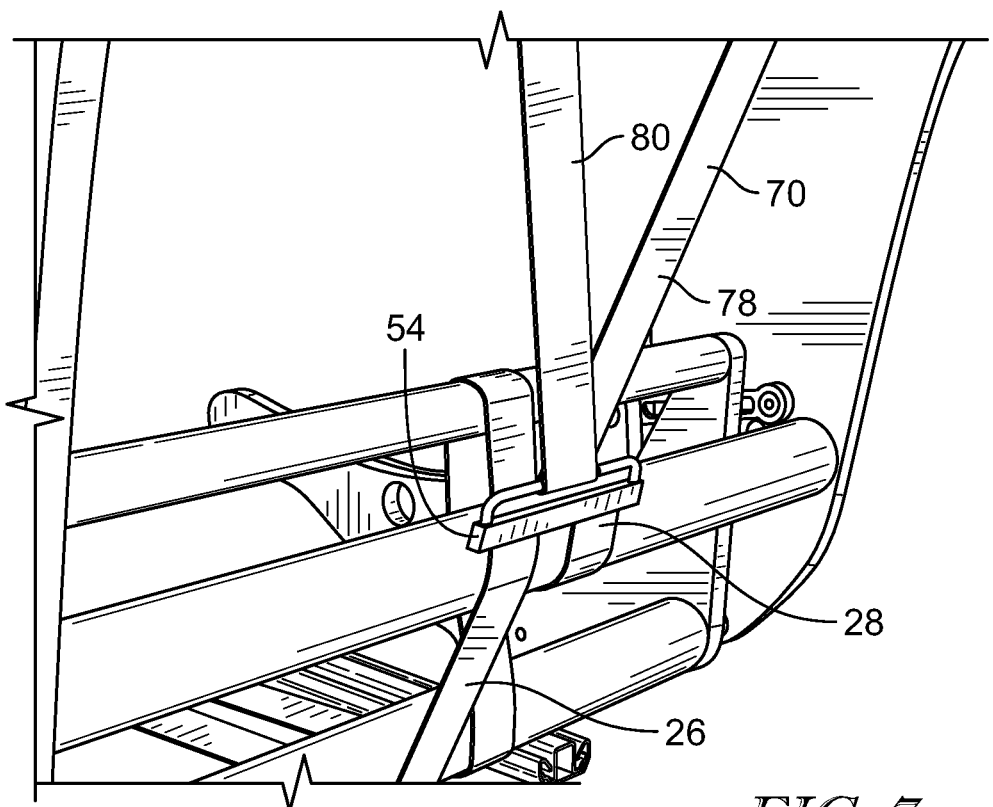
FIG. 7 is a rear perspective view of the retention assembly including a bridle in a retracted position to retract a chest segment of the retention assembly.
Figure 8:
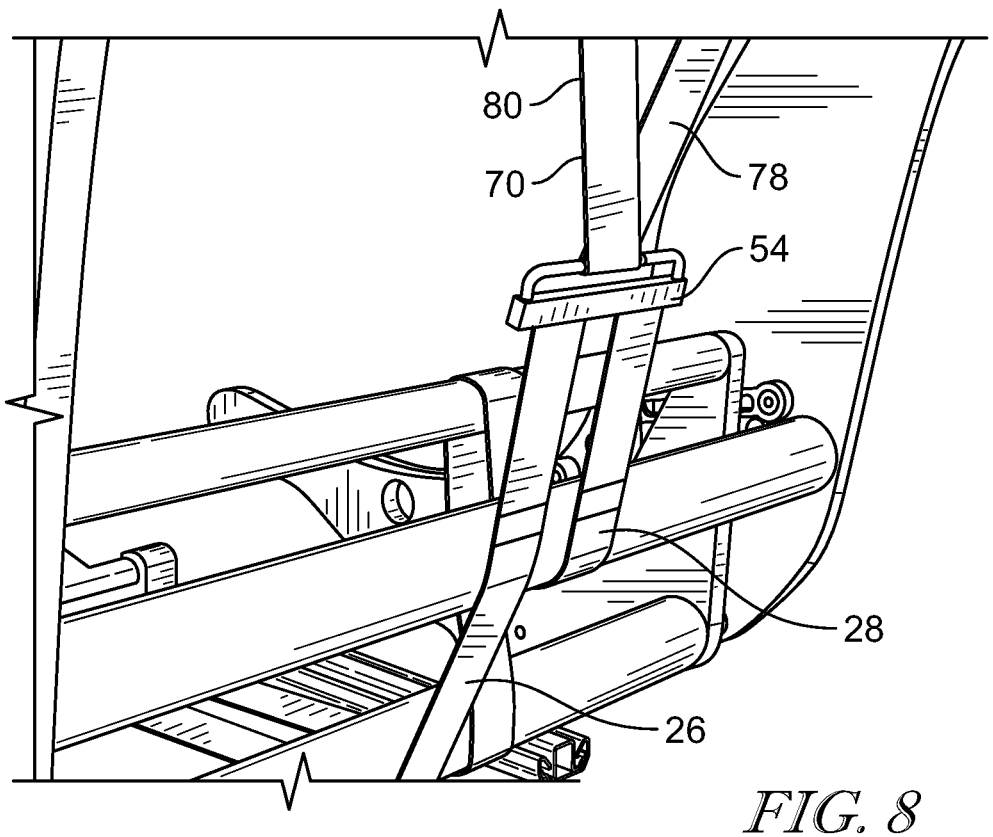
FIG. 8 is a rear perspective view of the retention assembly having a bridle in an extended position to extend a chest segment of the retention assembly.

Referring to FIGS. 7 and 8, the driven belt 70 is adjustable for the occupant's comfort. That is, the driven belt 70 can be loosened to provide extra space for the occupant or the driven belt 70 can be tightened to further secure the occupant in the vehicle seat 10. The driven belt 70 is loosened or tightened by adjusting the forward driving belt 26 and the rearward driving belt 28. The forward locking unit 30 and the rearward locking unit 32 extend and contract the forward driving belt 26 and the rearward driving belt 28 to move the bridle 54.

For example, in FIG. 7, the forward driving belt 26 and the rearward driving belt 28 are retracted to pull the bridle 54 downward. As the bridle 54 is pulled downward, the driven belt 70 is likewise pulled downward. The downward movement of the bridle 54 pulls the seat back segment 78 and the seat back segment 80 downward so that the chest belt 82 is contracted. The contraction of the chest belt 82 tightens the chest belt 82 about the occupant.

In FIG. 8, the forward driving belt 26 and the rearward driving belt 28 are extended so that the bridle can move upward. In particular, when the occupant of the vehicle seat 10 moves such that additional slack is required in the chest belt 82, the chest belt 82 pulls the seat back segment 78 and the seat back segment 80. The seat back segment 78 and the seat back segment 80 pull the bridle 54 upward to allow the additional slack in the chest belt 82. As the bridle 54 is pulled upward, the forward locking unit 30 and the rearward locking unit 32 enable the forward driving belt 26 and the rearward driving belt 28 to be expanded to enable the movement of the bridle 54.

The bridle 54 allows the occupant to move in the vehicle seat 10 freely. As the occupant moves, the bridal 54 travels up and pulls evenly on the locking assembly 22. When there is a quick motion fore or aft, the inertia locks the locking assembly 22. The V shape of the seat back segment 78 and the seat back segment 80 ensures that when the locking assembly 22 is engaged the load is distributed across the seat back 14. The retention assembly 20 could also be employed on a 4 point harness system.

Automobiles are currently being developed for autonomous driving. Currently vehicle seat designs for extended travel range, deep recline, and swivel may have occupant retention integrated into the seat itself as opposed to other parts of the vehicle structure. Challenges associated with providing a retention system for all-belts-to-seat (ABTS) designs include an increase in the weight and cost associated with the necessary structural reinforcements added to the seat structure to meet increased dynamic loads. Generally, ABTS systems fix the recoiler in some fashion to the seat back with the belt exiting up on the shoulder area.

Additionally, seat loading in an accident is varied and complex. Current asymmetric designs may increase challenges. An off-center load applied to backrest, by ABTS belt or rear occupant, may result in torsional load in yaw or bending or deflection in side members. Also, a large torque load may be applied on the recliner. In some cases, the track sections bend or peel off of their fixments to a floor of the vehicle. It is desired to apply an ABTS belt that does not increase the costs and weight associated with the seat structure.

The invention claimed is:

1. A vehicle seat comprising:
   a seat bottom,
   a seat back coupled to the seat bottom and configured to move relative to the seat bottom, and
   a reclining assembly coupled to the seat bottom and the seat back, the reclining assembly configured to move the seat back about a virtual center of rotation located forward of the seat back,
   wherein the virtual center of rotation is located above the seat bottom, and
   wherein the reclining assembly comprises a gear coupled to the seat bottom, a first link having a first end coupled to the seat back and a second end that meshes along the gear, and a second link having a first end coupled to the seat back and a second end that meshes along the gear.

2. The vehicle seat of claim 1, wherein the gear includes a plurality of teeth positioned circumferentially around the gear and the second end of the first link includes a plurality of teeth that mesh within the teeth of the gear.

3. The vehicle seat of claim 1, wherein the gear includes a plurality of teeth positioned circumferentially around the gear and the second end of the second link includes a plurality of teeth that mesh within the teeth of the gear.

4. The vehicle seat of claim 1, wherein the gear rotates about a first axis, the second end of the first link rotates about a second axis, and the second end of the second link rotates about a third axis, wherein the virtual center of rotation is positioned forward of the first axis, the second axis, and the third axis.

5. The vehicle seat of claim 1, wherein movement of the seat back relative to the seat bottom includes a linear component and an angular component.

6. The vehicle seat of claim 1, further comprising a retention assembly including at least one driving belt coupled to the seat bottom and the seat back, and a driven belt coupled to the driving belt and the seat back, the driven belt configured to position around an occupant of the vehicle seat.

7. The vehicle seat of claim 6, wherein the at least one driving belt applies tension to the driven belt when a force is applied to the vehicle seat.

8. A vehicle seat comprising:
   a seat bottom,
   a seat back coupled to the seat bottom and configured to move relative to the seat bottom,
   a locking assembly coupled to the seat bottom,
   a pair of driving belts coupled to the locking assembly, and
   a driven belt coupled to the pair of driving belts and the seat back, the driven belt configured to position around an occupant of the vehicle seat,
   wherein one of the pair of driving belts applies tension to the driven belt when a force is applied to the vehicle seat.

9. The vehicle seat of claim 8, wherein the pair of driving belts comprises a first driving belt and a second driving belt and the first driving belt applies tension to the driven belt when a forward force is applied to the vehicle seat.

10. The vehicle seat of claim 9, wherein the second driving belt applies tension to the driven belt when a backward force is applied to the vehicle seat.

11. The vehicle seat of claim 8, further comprising a bridle that couples the pair of driving belts to the driven belt.

12. The vehicle seat of claim 11, wherein one of the pair of driving belts moves the bridle to apply tension to the driven belt.

13. The vehicle seat of claim 8, wherein the locking assembly includes a forward locking unit and a rearward locking unit, the forward locking unit is coupled to a first driving belt of the pair of driving belts, and the rearward locking unit is coupled to a second driving belt of the pair of driving belts.

14. The vehicle seat of claim 8, wherein one of the pair of driving belts comprises a first segment extending from the locking assembly to a first crossbar, a second segment extending from the first segment to a second crossbar, a third segment extending from the second segment to a third crossbar, and a fourth segment extending from the third segment to a bridle that couples to the driven belt.

15. The vehicle seat of claim 8, wherein one of the pair of driving belts comprises a first segment extending from the locking assembly to a crossbar and a second segment extending from the first segment to a bridle that couples to the driven belt.

16. The vehicle seat of claim 8, wherein the driven belt comprises a first segment extending from a fixed end at a crossbar to a bridle that couples to the pair of driving belts, a second segment extending from the first segment to the crossbar, and a third segment extending from the second segment to a buckle end.

17. The vehicle seat of claim 8, further comprising a reclining assembly coupled to the seat bottom and the seat back, the reclining assembly configured to move the seat back about a virtual center of rotation located forward of the seat back, wherein the virtual center of rotation is located above the seat bottom.

18. The vehicle seat of claim 17, wherein the reclining assembly comprises a gear coupled to the seat bottom, a first link having a first end coupled to the seat back and a second end that meshes along the gear, and a second link having a first end coupled to the seat back and a second end that meshes along the gear.

19. A vehicle seat comprising:
a seat bottom,
a seat back coupled to the seat bottom and configured to move relative to the seat bottom, and
a reclining assembly coupled to the seat bottom and the seat back, the reclining assembly including a gear coupled to the seat bottom, a first link having a first end coupled to the seat back and a second end that meshes along the gear, and a second link having a first end coupled to the seat back and a second end that meshes along the gear.

\* \* \* \* \*